US012800751B2

(12) United States Patent
Boehlefeld et al.

(10) Patent No.: US 12,800,751 B2
(45) Date of Patent: Nov. 17, 2026

(54) NON-DESTRUCTIVE INSPECTION OF TIRES USING RADAR TOMOGRAPHY

(71) Applicant: The Goodyear Tire & Rubber Company, Akron, OH (US)

(72) Inventors: Robert John Boehlefeld, Brecksville, OH (US); Carl Trevor Ross Pulford, Akron, OH (US); Christy Lyn Quinn, Wadsworth, OH (US); Gary Lynn Davis, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 145 days.

(21) Appl. No.: 18/511,052

(22) Filed: Nov. 16, 2023

(65) Prior Publication Data

US 2024/0192359 A1 Jun. 13, 2024

Related U.S. Application Data

(60) Provisional application No. 63/386,937, filed on Dec. 12, 2022.

(51) Int. Cl.

| | |
|---|---|
| ***G01S 13/89*** | (2006.01) |
| ***G01S 7/41*** | (2006.01) |
| ***G01S 13/931*** | (2020.01) |

(52) U.S. Cl.

CPC ................ *G01S 13/89* (2013.01); *G01S 7/41* (2013.01); *G01S 13/931* (2013.01)

(58) Field of Classification Search

CPC ...... G01S 13/887; G01S 13/889; G01S 13/89; G01S 13/931; G01S 7/41

See application file for complete search history.

(56) References Cited

U.S. PATENT DOCUMENTS

| | | | | |
|---|---|---|---|---|
| 4,785,354 | A | 11/1988 | Nakamura | |
| 5,095,744 | A * | 3/1992 | Macecek | G01M 17/025 73/146 |
| 6,480,141 | B1 * | 11/2002 | Toth | G01N 22/00 342/22 |
| 6,736,004 | B2 * | 5/2004 | Evans | B60C 23/066 73/146 |
| 7,299,694 | B2 * | 11/2007 | Byrne | G01M 17/027 73/146 |
| 8,345,949 | B2 * | 1/2013 | Zhao | G06T 7/0004 382/141 |
| 8,593,157 | B2 | 11/2013 | Adams | |
| 9,188,518 | B2 | 11/2015 | Snyder | |
| 9,669,664 | B2 * | 6/2017 | Kretschmann | B60C 11/243 |
| 9,702,833 | B2 * | 7/2017 | Decroux | G01N 23/185 |
| 9,805,697 | B1 * | 10/2017 | Dorrance | B60C 99/006 |

(Continued)

*Primary Examiner* — Peter M Bythrow

(74) *Attorney, Agent, or Firm* — Edward T. Kennedy

(57) ABSTRACT

Disclosed are examples related to non-destructive examination of tires using radar tomography. A radar signal can be used to illuminate a portion of a tire. Reflected radar signals can be received and used to generate a 3D image of at least the portion of the tire. The radar signals can illuminate a tread of the tire, an innerliner of the tire, and/or one or both sidewalls of the tire. The 3D image can include structural information of the tire that can be used to identify defects or damage in the tire. The examination can be conducted on new tires during fabrication, on existing tires during operation, and/or on used tires during refurbishment.

20 Claims, 8 Drawing Sheets

(56) References Cited

U.S. PATENT DOCUMENTS

| | | | | |
|---|---|---|---|---|
| 10,068,322 | B2 * | 9/2018 | O'Connor | G06T 7/0004 |
| 10,209,205 | B2 * | 2/2019 | Shaughnessy | G01M 17/028 |
| 10,286,735 | B2 * | 5/2019 | Guinart | B60C 23/0408 |
| 10,399,393 | B1 * | 9/2019 | Trotta | B60C 23/0452 |
| 10,675,925 | B1 * | 6/2020 | Oakes, III | B60C 23/0486 |
| 10,773,557 | B1 * | 9/2020 | Mast | G01B 11/22 |
| 11,137,478 | B2 | 10/2021 | Park | |
| 11,138,748 | B2 * | 10/2021 | Tenkasi Shankar | G06T 7/50 |
| 11,660,913 | B2 * | 5/2023 | MacPherson | B60C 11/246 702/34 |
| 2003/0154007 | A1 * | 8/2003 | Evans | B60T 8/1725 701/514 |
| 2005/0120787 | A1 * | 6/2005 | Thiesen | B60C 11/24 73/146.5 |
| 2005/0268707 | A1 * | 12/2005 | Dale | G01M 17/027 73/146 |
| 2006/0012510 | A1 * | 1/2006 | Rowe | G07B 15/02 342/42 |
| 2007/0263907 | A1 * | 11/2007 | McMakin | G06V 40/25 382/107 |
| 2009/0000370 | A1 * | 1/2009 | Lionetti | G01B 11/22 73/146 |
| 2009/0021720 | A1 * | 1/2009 | Hecker | B60G 17/0165 356/4.01 |
| 2010/0000310 | A1 * | 1/2010 | Braghiroli | B60C 11/246 73/146 |
| 2012/0067115 | A1 * | 3/2012 | Pingel | B60C 11/246 73/146 |
| 2012/0291936 | A1 * | 11/2012 | Lionetti | B60C 23/0462 156/123 |
| 2016/0033368 | A1 * | 2/2016 | Neau | G01M 17/02 702/34 |
| 2016/0121671 | A1 * | 5/2016 | Neau | G01M 17/027 703/6 |
| 2017/0254897 | A1 * | 9/2017 | Tron | G01S 13/87 |
| 2017/0361662 | A1 * | 12/2017 | Wei | B60C 11/24 |
| 2019/0009618 | A1 * | 1/2019 | McPillan | B60Q 9/00 |
| 2019/0187027 | A1 * | 6/2019 | Lin | B60C 23/0408 |
| 2020/0031173 | A1 * | 1/2020 | Scheckter | G01M 17/027 |
| 2020/0070589 | A1 * | 3/2020 | Kuerzl | B60C 11/246 |
| 2020/0098121 | A1 * | 3/2020 | Tenkasi Shankar | G06T 7/0004 |
| 2020/0302624 | A1 * | 9/2020 | Tenkasi Shankar | G01B 21/18 |
| 2021/0197625 | A1 * | 7/2021 | Laperle | G01M 17/013 |
| 2022/0258548 | A1 * | 8/2022 | Nordmeyer | G01S 13/06 |
| 2023/0070720 | A1 | 3/2023 | Wilson, II | |
| 2023/0182509 | A1 * | 6/2023 | Prabhakara | B60C 19/00 73/146 |

* cited by examiner

NON-DESTRUCTIVE INSPECTION OF TIRES USING RADAR TOMOGRAPHY

BACKGROUND

Tires are used in a wide range of vehicles such as aircraft, trucks, automobiles, etc. Non-destructive inspection of new and used tires to evaluate the tire condition can avoid potential problems during their use. To provide an indication of tire conditions, prior art indirect estimation techniques have been developed. However, such indirect estimation can be difficult to perform accurately, and typically involves complex modeling techniques. Moreover, such estimation does not provide any indication of the presence of foreign object damage (FOD) or other defects in the tire, which can be important for the use or retreading of the tire. Nor is the depth of the damage or defect known without physically probing the tire, which can produce more damage and itself cause the tire to be unusable or unsuitable for retreading. Non-destructive inspection by shearography gives limited information about the location and size of a defect but no information about the depth of the defect (radially), which is an important factor determining the retreadability of the tire.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DEFINITIONS

Figure 1:
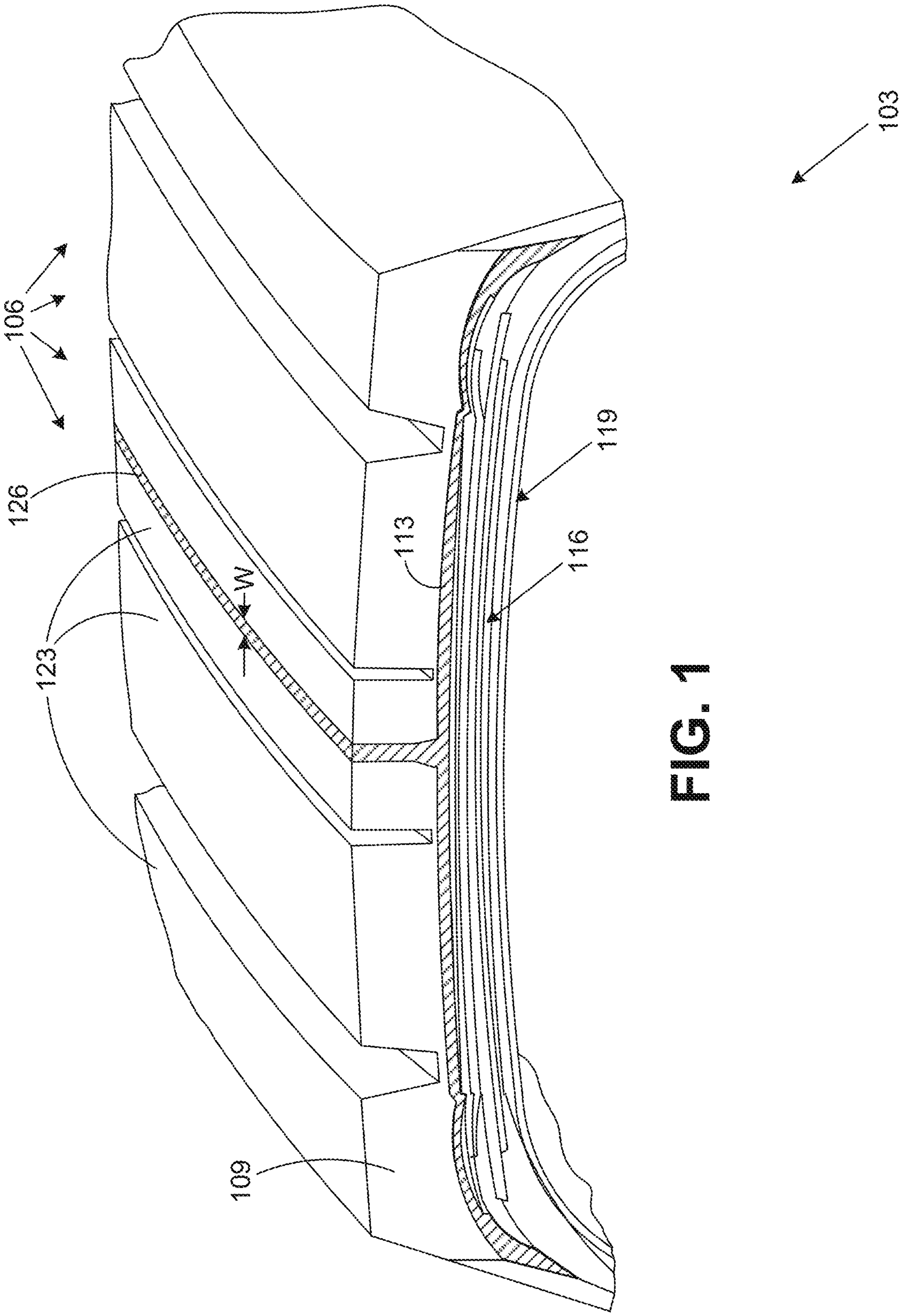
FIG. 1 is a partial cross-sectional perspective view illustrating an example of a portion of a tire according to various embodiments of the present disclosure.

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Inboard side" means the side of the tire nearest the vehicle when the tire is mounted on a wheel and the wheel is mounted on the vehicle.

"Innerliner" means the layer or layers of elastomer or other material that form the inside surface of a tubeless tire and that contain the inflating fluid within the tire.

"Lateral" means an axial direction.

"Outboard side" means the side of the tire farthest away from the vehicle when the tire is mounted on a wheel and the wheel is mounted on the vehicle.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Tread element" or "traction element" means a rib or a block element defined by a shape having adjacent grooves.

DETAILED DESCRIPTION

Disclosed herein are various examples related to non-destructive examination of tires using radar tomography. Reference will now be made in detail to the description of the embodiments as illustrated in the drawings, wherein like reference numbers indicate like parts throughout the several views.

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

Referring to FIG. 1, shown is a cross sectional view of a portion of a tire 103 according to various embodiments. The tire 103 includes a tread 106 comprising multiple tread elements 109. The tread 106 is positioned adjacent to, and radially outward relative to, an undertread 113. The gauges (or thicknesses) of the different components can be varied depending on the desired characteristics of the tire 103. The tire 103 includes a pair of sidewalls, where each one of the sidewalls extend radially outwardly from a respective bead to the tread 106. The tire 103 also includes a belt package 116 positioned radially inwardly relative to the undertread 113. The tire 103 includes a carcass with an innerliner 119 and other components as can be appreciated. For example, the carcass can include one or more ply (e.g., cord and/or reinforced rubber) and all rubber components (e.g., a squeegee barrier and/or bottom ply coat) between the belt package 116 and the innerliner 119.

The various tire components can be manufactured from a wide range of materials. For instance, the tread 106 can comprise rubber (or rubber material) over the undertread 113, which can be constructed from a rubber material. The belt package 116 can comprise merged cords or nylon cords. The innerliner 119, the squeegee barrier and the bottom ply coat can comprise appropriate materials. The sidewalls can also comprise multiple layers or plies with the innerliner 119 extending along an inner surface of the sidewalls. The inner surface of the innerliner 119 can also be covered with one or more protective coating.

When the tire 103 is installed on a vehicle (e.g., aircraft, truck, car, etc.), the tire 103 supports the weight of the vehicle and its cargo on the ground upon which the vehicle travels. In this respect, the ground includes all elements upon which a vehicle may travel including pavement, cement, steel (bridges) dirt, rocks, or any other elements as can appreciated. During use, the tire 103 can experience wear and/or foreign object damage (FOD) as it travels along the ground. Tracking or monitoring tread damage over time is useful to understanding the life of the tire 103. Currently, FOD in the tread 106 of a tire is probed using hand tools to determine the extent of the damage. However, without extreme care the probing can result in further damage to the tire 103. Thickness of the innerliner 119 is also a concern. Thin spots in the inner liner can reduce the ability of the tire 103 to retain air pressure. It can also result in voids between different layers or plies, which can lead to further wear and damage to the tire 103.

Radar tomography offers the ability to non-destructively evaluate the condition of a tire 103. By illuminating a portion of the tire 103 with a radar signal and detecting reflections produced by the differences in the component material characteristics, it is possible to evaluate the tire structure to determine if potential problems exist. Interfaces between the different layers or plies, where the dielectric properties of the materials change, reflect a portion of the radar signal. The reflections can be analyzed to generate a three-dimensional (3D) image of a portion of the tire 103, which can indicate gauges of the layers or plies and the presence of voids or damage in the tire 103. This is equally applicable to the evaluation of new tires during fabrication, tires that are in use, or tires that are being processed for retreading and reuse.

Figure 2A:
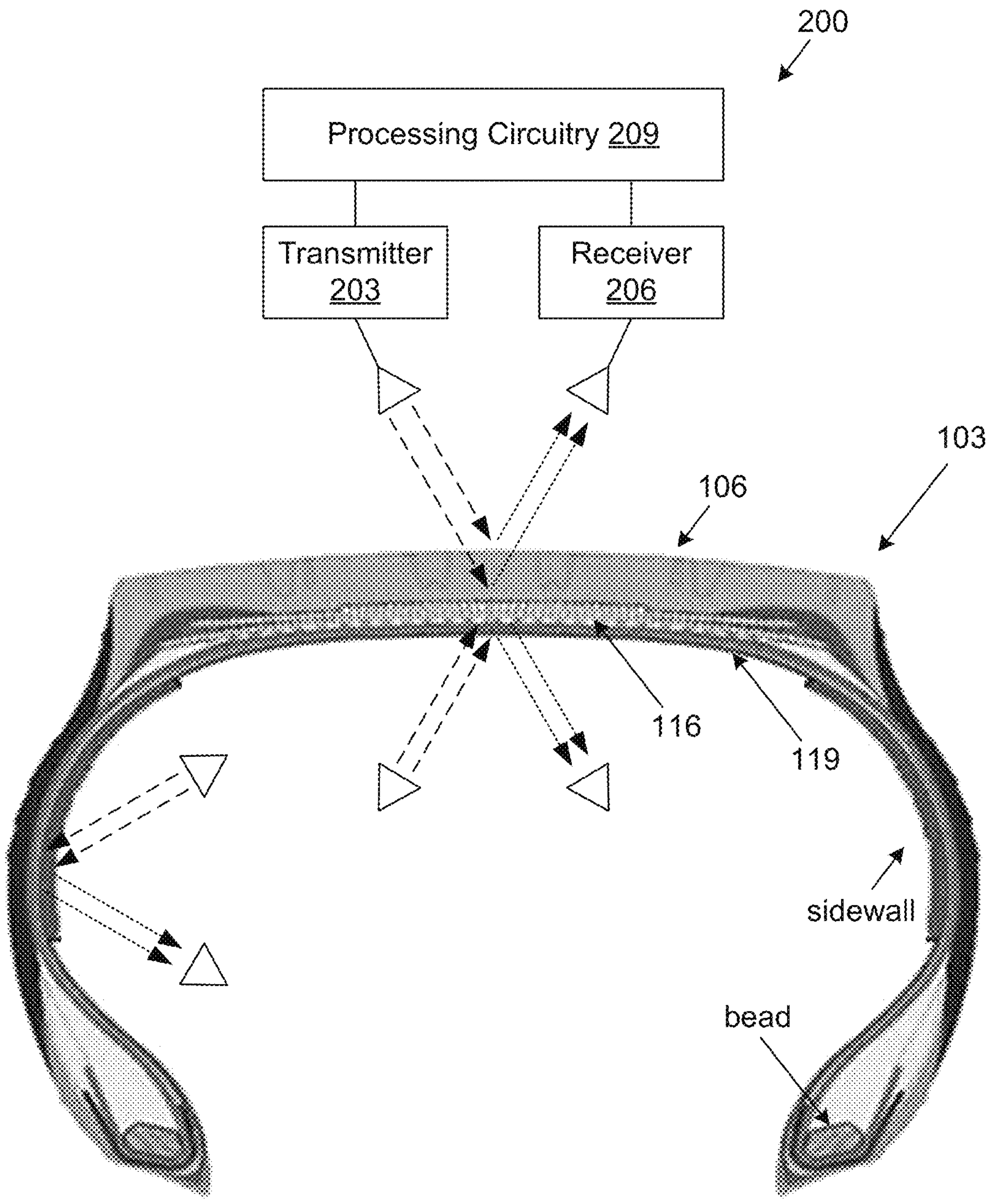
FIGS. 2A and 2B illustrate examples of radar tomography of a tire according to various embodiments of the present disclosure.

Referring to FIG. 2A, shown is an example of an apparatus 200 that can be used for radar tomography of tires. As illustrated in FIG. 2A, the apparatus 200 can include a transmitter 203, a receiver 206 and processing circuitry 209 for controlling the transmission of the radar signal and processing of the received reflection signals. The processing circuitry 209 can comprise a processor and memory or other circuitry as needed. The radar signal can be transmitted by the transmitter 203 via an antenna or antenna array, which can direct the radar signal to a portion of the tire 103, and the reflections can be received by the receiver 206 via an antenna or antenna array. The coverage area can vary depending on the design of the antennas. A 3D representation of the tire structure can be generated based upon the reflected signals. The transmitter can sweep over a range of transmission frequencies and the reflected signals can be captured and processed by the processing circuitry 209 to create the 3D image. The processing circuitry 209 can further include an antenna (not shown) for wirelessly transmitting tire information and radar signal data to a remote processor for analysis, such as a cloud computing device.

Figure 2B:
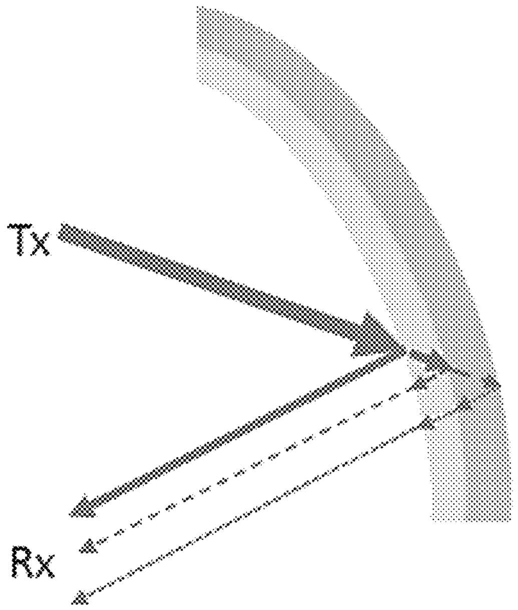

FIG. 2B illustrates an example of the signal reflection at the boundaries of the different materials. Both the exterior surface and interior interfaces within the tire 103 can be detected to the depth penetrated by the radar signal. A portion of the transmitted radar signal is reflected by the difference in the material properties and a portion of the radar signal continues to propagate through the next layer. Larger discontinuities between the layer materials can produce larger reflections. This is especially true in the case of voids or air pockets in the tire 103, which result in a much stronger reflection making it easier to identify damage to the tire 103. A 3D image of the tire structure can be generated based upon the received signals. The time delay between the transmission and reception of the reflected radar signals can be used to determine the gauge (or thickness) of the materials. By controlling directionality of the radar signals, locations of defects or damage can also be determined. In some implementations, the transmitter 203 and receiver 206 can be located on opposite side of the tire 103 so that the radar signal passing through the tire 103 is received by the receiver 206.

While a common antenna can be used for both transmission and reception of the radar signals, the use of separate transmit and receive antennas, as shown in FIG. 2A, can improve receiver sensitivity, especially at lower signal levels. The antennas can be, e.g., a horn antenna or an antenna array configured to illuminate a wide scan area on the tire 103. For example, the antennas (or antenna arrays) can be configured to scan across a width of the tread 106 (shoulder-to-shoulder). By rotating the tire 103, the apparatus 200 can acquire radar measurements around the circumference of the tire 103. This can then be used to generate a 3D image showing the structural features around the tire 103. As illustrated in FIG. 2A, the tire 103 can be examined around the outer surface to evaluate the tread 106 and undertread 113, or can be examined along the inner surface to evaluate the innerliner 119, or can be examined along the sides (either internally as illustrated in FIG. 2A or externally) to evaluate the sidewalls. By examining all of these portions of the tire 103, a complete picture of the tire condition can be determined.

There is an inevitable compromise between the depth of penetration of electromagnetic (EM) waves into an object and the accuracy that can be obtained in the image (the higher the frequency, the higher the accuracy; but also the less it can penetrate a given material). The frequency (or wavelength) of the EM wave and the dielectric properties of the object (at that frequency) is the key performance indicator for this compromise and will define the frequencies of operation. The transmitter 203 can sweep over a range or frequencies to generate the 3D image. For example, the frequency range can be from about 50 GHz to about 300 GHz or higher, about 75 GHz to about 250 GHz or higher, about 75 GHz to about 150 GHz or higher, about 100 GHz to about 200 GHz or higher, about 140 GHz to about 220 GHz or higher, or other combinations of these frequencies. Resolution is dependent upon the radar frequencies used to examine the tire 103. For instance, high frequency EM waves (>100 GHz) can facilitate measurement of component gauges with sub-mm resolution (e.g., 0.2 mm or less).

Strength of the radar signal can also affect the penetration into the tire 103. In addition, the signal strength will need to overcome the noise floor of the reflections. As noted above, the depth of penetration is affected by the material. To establish the ability to examine tires, testing was performed on a range of materials found in medium radial truck (MRT) tires including innerliners (with 0.25", 0.5", 0.75" and 1" thicknesses) and barriers (with 0.25", 0.5", 0.75" and 1" thicknesses) and aircraft tires including tread (with 0.25", 0.5", 0.75" and 1" thicknesses), cushion or undertread (with 0.25", 0.5", 0.75" and 1" thicknesses) and belt (with 0.25", 0.5", 0.75" and 1" thicknesses). The depth penetration is equally applicable to passenger vehicle tires, light truck tires, and other types of tires.

During the testing, 1601 equally spaced, discrete frequency data points were collected from 140 GHz to 220 GHz at about 7 dB of gain (with an analyzer output power of about 10 mW). In all cases positive general trends were seen. Strong energy transmission is seen in the ¼" and ½" thicknesses across the entire frequency range, while the ¾" plots show good transmission properties at the lower frequencies, but more noise like properties (randomly distributed magnitudes) at the higher frequencies. A limit was reached and the 1" samples exhibited little to no energy transmission (i.e., noise like curves). Increased transmission gain (e.g., 30 dB+) for higher signal strength can improve the penetration results.

Figure 2C:
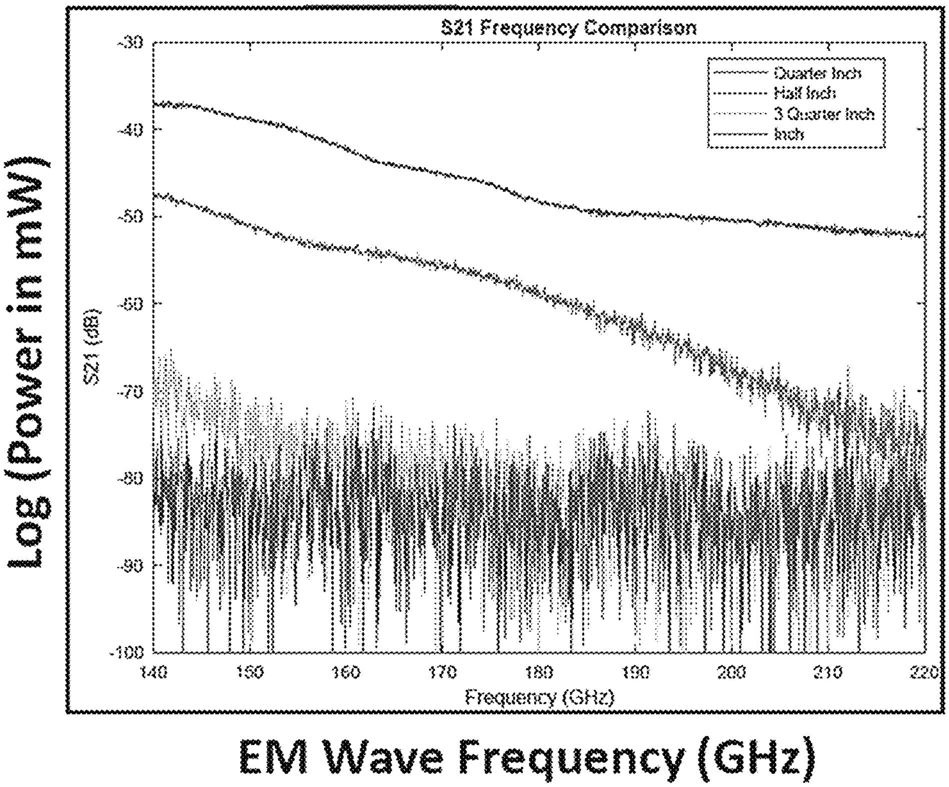
FIGS. 2C and 2D illustrate examples of test results of an innerliner in frequency and time domains according to various embodiments of the present disclosure.
Figure 2D:
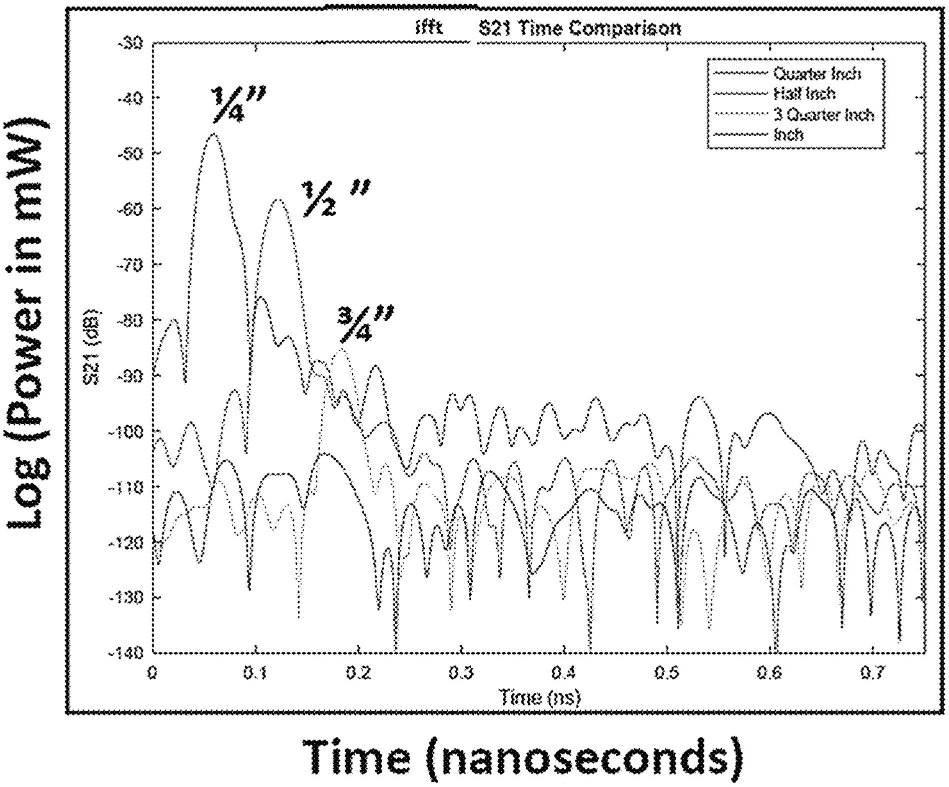

Examples of the test results for the innerliner are shown in FIGS. 2C and 2D. FIG. 2C shows raw radar signal data plotted as the received power vs. EM wave frequency over the 140 GHz to 220 GHz range. For the same power, the penetration depth of EM waves decreases at higher frequencies. Using an IFFT, the frequency data was transformed to the time domain as shown in FIG. 2D. Differences in the time domain signals from innerliner material, bottom ply coat material and a stack of the innerliner material with bottom ply coat material show that detection of these compounds and their gauges. The noise floor, below which the signal strength is too low, is about −120 dBm. Even 10 mW radar signals were able to penetrate the ¾" thickness of compounds with enough signal strength to all digital image processing to produce a 3D image. An increase in power of the EM waves can improve penetration of the signals in the materials.

Figure 3:
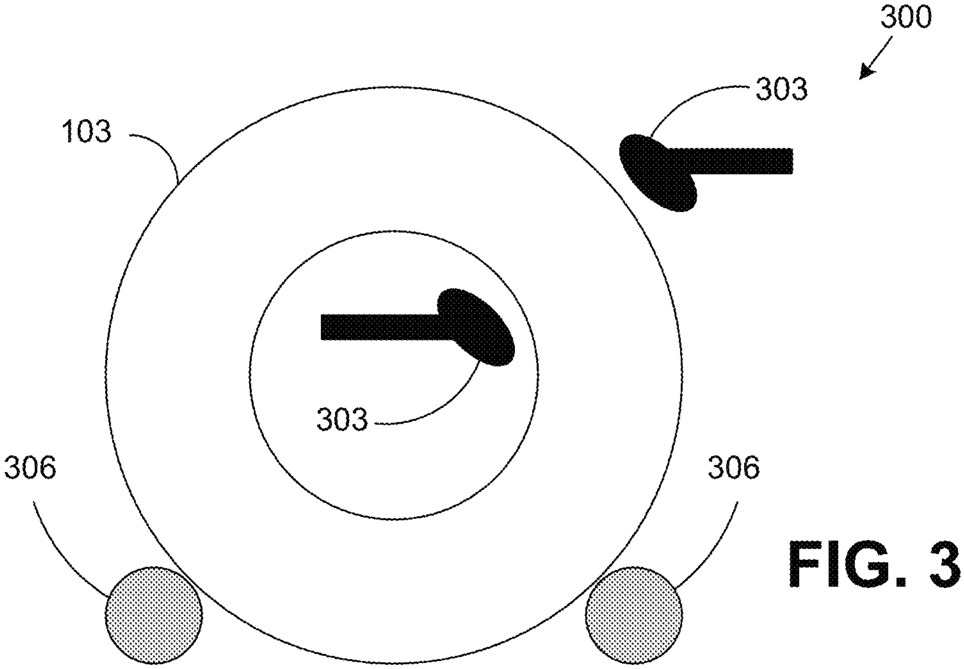
FIG. 3 illustrates an example of an apparatus for non-destructive inspection of tires according to various embodiments of the present disclosure.

Referring to FIG. 3, shown is an example of an inspection apparatus 300 for non-destructive inspection of tires 103. The inspection apparatus 300 can used for testing of newly fabricated tires, used tires, tires during processing, or refurbished tires. The inspection apparatus 300 can comprise one or more probes 303 configured to transmit radar signals and receive reflected radar signals from the tire 103 being examined. The inspection apparatus 300 can also include rollers 306 (or other supports) to hold the tire 103 in position with respect to the probe 303 during the examination. The use of rollers 306 allows the tire 103 to be rotated as it is exposed to the radar signal. Illumination of the tire 103 during rotation can allow for 3D imaging around the circumference of the tire 103. As shown in FIG. 3, one or more probes 303 can be located for examination of the tread or outer surface of the tire 103, the inner surface of the tire 103, and/or one or more sidewalls of the tire 103. The use of two probes 303 as shown in FIG. 3 can allow for simultaneous 3D imaging of, e.g., the tread 106 and innerliner 119.

In other implementations, the inspection apparatus 300 can hold the tire 103 in a fixed position and the probe 303 can be repositioned to expose the tire 103 to the radar signal. For example, one or more probes can be rotated within the tire 103 to examine the innerliner 119 or moved about the tire 103 to examine the tread 106 and/or sidewall. For instance, a support arm can position a probe 303 at a fixed location within the center of the tire 103 and the probe 303 can be rotated (e.g., 360 degrees or less) to illuminate the interior surface of the tire 103. In some embodiments, multiple probes 303 in different orientations can be positioned within the tire 103 using the support arm and rotated to examine the inner surface. Similarly, the tire 103 can be held in a fixed position and one or more probe 303 can be rotated or moved about the tire 103 to illuminate the outer surface (e.g., tread 106 and/or sidewall) of the tire 103. For example, the probe 303 can be mounted on a support arm or other structure configured to reposition the probe 303 about the tire 103 to expose it to the radar signal. In alternative embodiments, the probe 303 can be manually repositioned by an operator to examine the tire 103.

Individual probes 303 can comprise a transmit antenna (or antenna array) for transmission of the radar signal provided by a transmitter 203 and a receive antenna (or antenna array) for reception of the reflected radar signal for provision to a receiver 206 as discussed with regard to the apparatus 200 of FIG. 2A. The use of separate transmit and receive antennas, as shown in FIG. 2A, can improve receiver sensitivity, especially at lower signal levels. The probe location can be fixed or adjustable to facilitate the examination of the tire 103. For example, the tire 103 can be positioned on the rollers 306 between the probes 303 (either manually or in an automated fashion) and then rotated during illumination by the probes 303. The probes 303 can be configured to illuminate the width of the tire 103 to minimize the examination time. In this way, reflected radar signals are obtained across the width of the tire 103 in a single pass. By illuminating the tire 103 across its width (e.g., 6 inches), processing of multiple tires 103 can be enhanced. The tire 103 can include one or more fiducial marker that can be used to synchronize the data captured by the probes 303 during the examination. The probe 303 can comprise processing circuitry 209 (as in apparatus 200) or can be in communication with processing circuitry 209 for operational control of the probe 303 and processing and evaluation of the radar signal data.

Rotation of the tire 103 by the rollers 306 can be controlled to coordinate the imaging of the tire 103 by the probes 303. Positioning of the probes 303, rollers 306, and/or illumination area may be fixed for a single tire size or may be adjustable to handle different tire sizes with the same inspection apparatus 300. For example, a probe 303 can be mounted on an adjustable support arm that can secure the probe 303 in a desired position during the examination of the tire 103. The adjustable support arm can also be configured to allow a single probe 303 to be positioned for imaging of different surfaces of the tire 103 (e.g., tread 106, innerliner 119 and/or sidewall). In other embodiments, the probe 303 can be a hand-held device that can be used by a user or operator during the examination of the tire 103. This can allow for as needed on-site examination of a tire 103 in a repair facility using existing tire stands.

One application that the inspection apparatus 300 can be utilized in is the refurbishment of tires, which includes buffing (removal of the tread 106) and retreading of the tire. For example, the inspection apparatus 300 can be used before buffing to non-destructively identify the location and extent of any damage present in the tire 103 before processing. The examination can be automated to inspect the tread 106, undertread 113, and/or belt package 116 (FIG. 1) around the time, replacing current visual inspection. The probe 303 can be configured to illuminate the tire 103 with radar signals (EM waves) to measure the depth of foreign object damage (FOD) with, e.g., 1 mm resolution or less. It have been found that 85% of damage involve holes with a diameter between 3/32" and 6/32" (2.1 mm-4.2 mm). The examination can be carried out over a range of transmission frequencies (e.g., abut 75 GHz to about 110 GHz) to satisfy the desired penetration depth and resolution for detection of faults. The radar signal strength can be set at a level sufficient to penetrate the tread 106 and detect damage up to, e.g., 0.3 inches below the tread 106, while being within safety limits. If the examination satisfies the defined inspection criteria, the tire 103 can accepted for buffing.

Figure 4A:
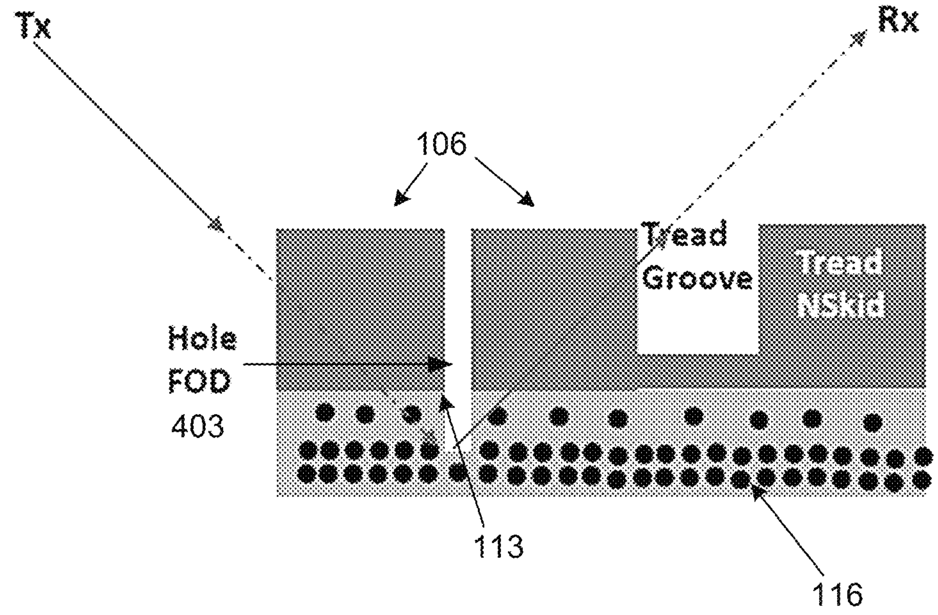
FIGS. 4A and 4B illustrate examples of non-destructive inspection of a tire before and after buffing according to various embodiments of the present disclosure.

FIG. 4A illustrates an example of the illumination of the tread 106 of an aircraft tire 103, which is shown with FOD 403 extending into the belt package 116. As shown in FIG. 4A, the transmitting (Tx) and receiving (Rx) antennas are physically separated allowing the FOD hole to be obliquely illuminated. In the example of FIG. 4A, the radar signal is transmitted at 45 degrees and passes through the tread 106 (e.g., with a gauge from about 0.16" to 1.4") and undertread (or cushion) 113 (e.g., with a gauge of about 0.88"). Utilizing a frequency range of 75-100 GHz (wavelength λ of 4 mm-3 mm) can provide a resolution of about 1 mm. Using an EM wave power of at least 80 dBm (100 kW) and antennas of at least 40 dBi can push the reflected signals decades above the noise floor. Super-resolution digital signal processing can be used to generate a 3D image for analysis and evaluation. For example, the processing circuitry 209 (FIG. 2A) can be configured to automatically identify the presence of damage and/or can render the 3D image for display to the user or operator. This testing can also be applied to newly fabricated tires or to the refurbished tires.

The inspection apparatus 300 can also be used for inspection after buffing of the tire 103. The buffed tire can be examined to non-destructively identify the location and extent of any damage still present in the tire 103. The inspection apparatus 300 can be used to non-destructively identify the location and extent of any damage present in the buffed tire without material removal (e.g., buzz-outs) or other physical probing. With the removal of the tread 106 from the tire 103, the probe 303 may be configured to illuminate the tire 103 for detection at a higher resolution (e.g., using a higher frequency range) with less penetration of the radar signals. This can facilitate identification of small holes that can be difficult to locate on a buffed surface. For example, damage that has gone beyond the first belt (for merged cords) or the second belt (for nylon cords) in the belt package 116 can be examined without the need to remove additional material for visual inspection. This can result in a greater quantity of tires 103 being accepted for retreading. In some cases, the buffed tire can be examined by a user or operator using a hand-held probe 303 to non-destructively show the extent of any damage.

Figure 4B:
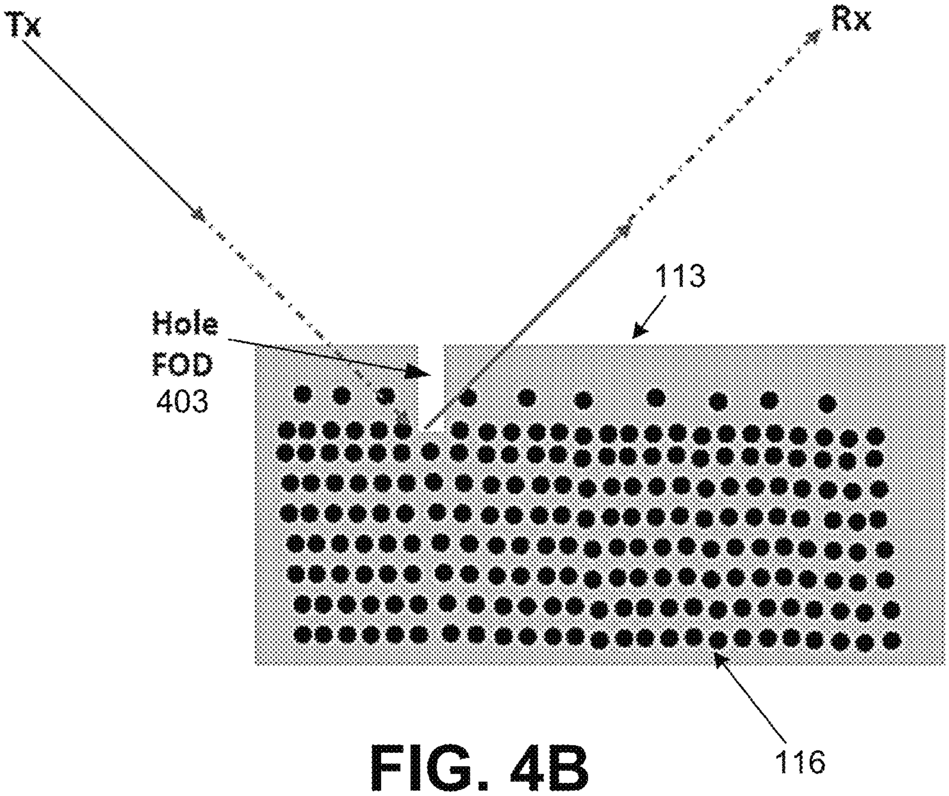

FIG. 4B illustrates an example of the illumination of the undertread (or cushion) 113 and belt package 116 of the aircraft tire 103 after buffing. As shown in FIG. 4B, the transmitting (Tx) and receiving (Rx) antennas remain physically separated allowing the FOD hole to be obliquely illuminated. The radar signal is again transmitted at 45 degrees and passes through the undertread 113 and belt package 116 (which can comprise merged cords or nylon cords in each belt layer). With a gauge of about 0.6" for the belts, the illumination arrangement described above can provide imaging of FOD through, e.g., 10 belts. Super-resolution digital signal processing can be used to generate the 3D image for analysis and evaluation. For example, the processing circuitry 209 can be configured to automatically identify the presence of damage and/or can render the 3D image for display to the user or operator.

Figure 5:
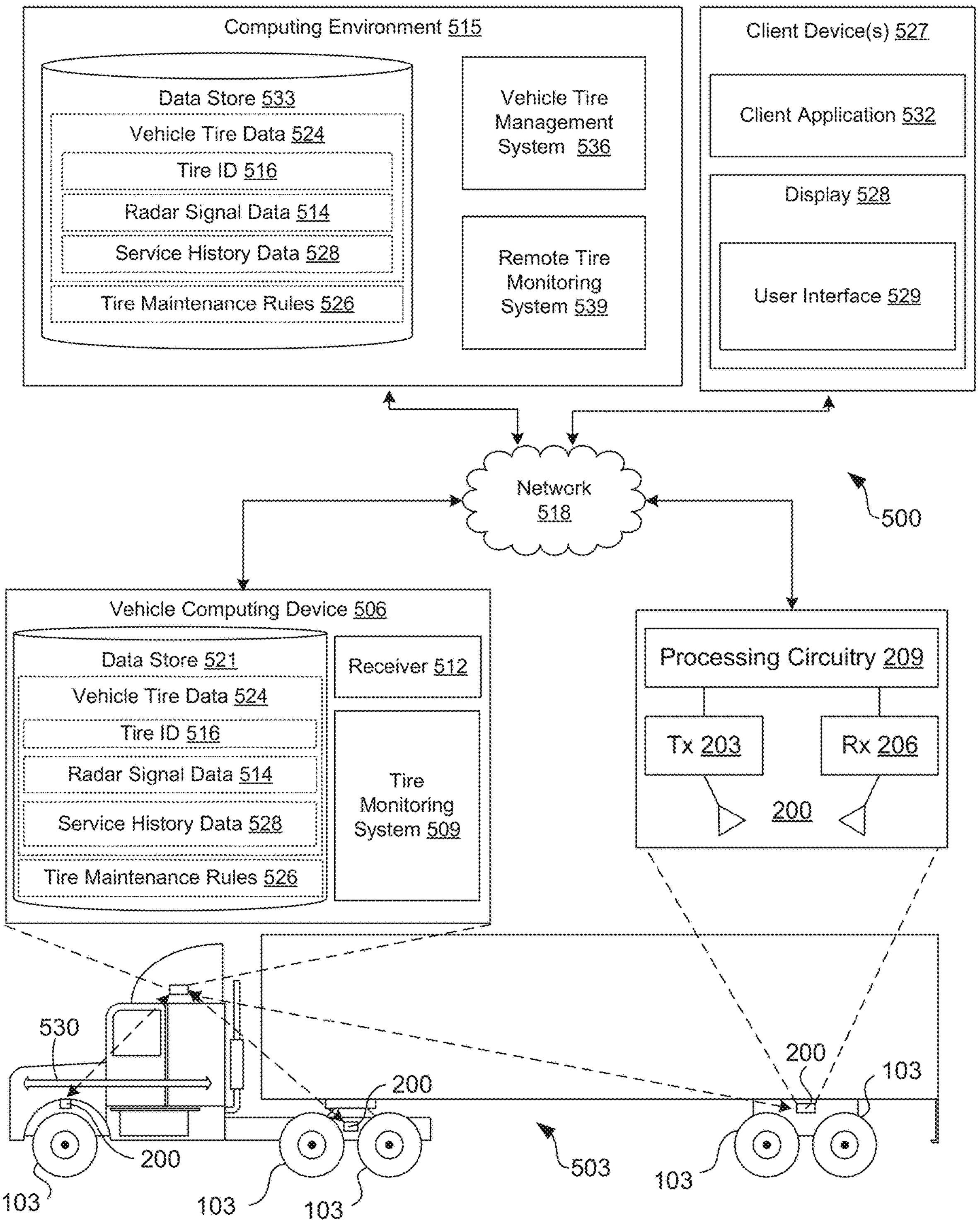
FIG. 5 is a schematic block diagram illustrating use of radar tomography of tires on a vehicle according to various embodiments of the present disclosure.

In addition to manufacturing and refurbishment applications, the apparatus 200 (FIG. 2A) can be applied to vehicles for monitoring of tire conditions during operation. FIG. 5 is a schematic block diagram illustrating use of the apparatus 200 for radar tomography of tires on a vehicle 503. As illustrated in FIG. 5, the apparatus 200 can be utilized with a networked environment according to various embodiments of the present disclosure. While the vehicle 503 is depicted as a commercial truck with trailer, the vehicle 503 may comprise any type of vehicle that employs tires where the commercial truck is presented as an example. To this end, the vehicle 503 may comprise other vehicles falling into various categories such as aircraft, passenger vehicles, off-road vehicles, commercial trucks, light trucks and the like, in which such vehicles 503 include a greater or lesser number of tires 103 than are shown in FIG. 5.

In the example of FIG. 5, the vehicle 503 comprising a plurality of tires 103. The vehicle 503 can also include one or more apparatus 200 for radar tomography of the tires 103. The apparatus 200 can be located adjacent to the tires 103 in order to illuminate the tread 106 and/or sidewall(s) of the tire 103. The apparatus 200 can be configured to monitor one or more of the tires 103 during operation of the vehicle 503 as previously discussed. For example, transmit and receive antennas can be positioned on the vehicle to monitor individual tires 103. The apparatus 200 may be configured to allow the processing circuitry 209 to be used for monitoring of multiple adjacent tires 103 through different sets of transmit and receive antennas.

In various examples, the processing circuitry 209 comprises a processor and memory to store vehicle tire information for individual tires 103 that are being monitored. For example, the vehicle tire information may include a tire identifier (ID), manufacturing information for the tire 103 (e.g., model number, manufacturer name, etc.), size information (e.g., rim size, width, and outer diameter), manufacturing location, manufacturing date, a treadcap code that includes or correlates to a compound identification, a mold code that includes or correlates to a tread structure identification, and/or other information. The vehicle tire information may also include operation and/or service history or other information to identify specific features and parameters of the tire 103. Alternatively or additionally, the vehicle tire information may be included in a separate vehicle storage medium, such as a vehicle computing device 506, which preferably is in electronic communication with the apparatus 200.

The processing circuitry 209 can further include an antenna (not shown) for wirelessly transmitting tire information and radar signal data to a remote processor for analysis, such as a processor integrated into a vehicle computing device 112, a Controller Area Network (CAN) bus associated with the vehicle 503, and/or a cloud computing device. According to various embodiments, each one of the tires 103 on the vehicle 503 may have a corresponding apparatus 200 for monitoring the tire 103 or select tires 103 may be monitored by an associated apparatus 200.

The tires 103 can be inspected by the apparatus 200 in a continuous fashion or can be examined on a periodic basis. For example, the apparatus 200 can be configured to illuminate the tire 103 after a defined period of time or after a defined distance traveled by the vehicle 503. This may be controlled by the processing circuitry 209 or may be prompted by the vehicle computing device 506. The tire information and radar signal data can then be stored by the processing circuitry 209 for later retrieval or can be communicated to the vehicle computing device 506 or cloud computing device for storing and/or further analysis. The tire information and radar signal data can be used to schedule maintenance or replacement of the tires 103 and/or to provide an indication to the vehicle operator of a condition arising in the tire 103.

The vehicle computing device 506 comprises a processor circuit that executes, for example, a tire monitoring system 509 and/or other applications. In one embodiment, the vehicle computing device 506 may be integrated with other systems in the vehicle 503. The vehicle computing device 506 can also a receiver 512 for obtaining radar signal data 514 transmitted from the apparatus 200 for radar tomography of tires 103 of the vehicle 503. In the case that the vehicle comprises a tractor-trailer, a vehicle computing device 503 may be located on the back of the trailer so as to be within range of wireless communication with the apparatus 200 of the trailer. In various examples, the vehicle computing device 506 can include a communication system to facilitate communication with a computing environment 515 over the network 518. In this respect, the vehicle computing device 506 may include appropriate communications capabilities to link to a cellular network, Wi-Fi network, BLUETOOTH® network, microwave transmission network, radio broadcast networks, or other communication networks.

Also, various data is stored in a data store 521 that is accessible to the vehicle computing device 506. The data store 521 may be representative of a plurality of data stores 521 as can be appreciated. The data stored in the data store 521, for example, is associated with the operation of the various applications and/or functional entities described below In various examples, the tire monitoring system 509 communicates with the processing circuitry 209 of the apparatus 200 periodically to obtain information (e.g., radar signal data 514) from the apparatus 200, where such information can include a tire identifier 516, radar signal data 514, and potentially other information from the apparatus 200. Such information is stored, for example, as vehicle tire data 524 in a memory associated with the vehicle computing device 506. In addition, the tire monitoring system 509 can include a timestamp in each radar signal data record to indicate when the data were read from the respective apparatus 200. Alternatively, the processing circuitry 209 may generate a timestamp at the time it provides the radar signal data to the tire monitoring system 509.

FIG. 5 illustrates an example of a networked environment 500 according to various embodiments. The networked environment 500 includes the computing environment 515, a client device 527, and a vehicle 503, which are in data communication with each other via the network 518. The vehicle 503 can include one or more vehicle computing devices 506, one or more apparatus 200 for radar tomography of tires 103, and a Controller Area Network (CAN) bus 530 that facilitates data communication between various systems on the vehicle 503. In one embodiment, the vehicle computing device(s) 506 are coupled to the CAN bus 530 and may communicate with systems included on the CAN bus 530.

The network 518 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 518 can also include a combination of two or more networks 518. Examples of networks 518 can include the Internet, intranets, extranets, virtual private networks (VPNs), and similar networks.

The computing environment 515 may comprise, for example, a server computer or any other system providing computing capability. Alternatively, the computing environment 515 may employ a plurality of computing devices that may be arranged, for example, in one or more server banks or computer banks or other arrangements. Such computing devices may be located in a single installation or may be distributed among many different geographical locations. For example, the computing environment 515 may include a plurality of computing devices that together may comprise a hosted computing resource, a grid computing resource, and/or any other distributed computing arrangement. In some cases, the computing environment 515 may correspond to an elastic computing resource where the allotted capacity of processing, network, storage, or other computing-related resources may vary over time.

Various applications and/or other functionality may be executed in the computing environment 515 according to various embodiments. Also, various data is stored in a data store 533 that is accessible to the computing environment 509. The data store 533 may be representative of a plurality of data stores 533 as can be appreciated. The data stored in the data store 533, for example, is associated with the operation of the various applications and/or functional entities described below.

The data stored in the data store 533 can include, for example, vehicle tire data 524, tire maintenance rules 526, and potentially other data. The vehicle tire data 524 can include information for each specific tire 103. For example, the vehicle tire data 524 may include a tire identifier 516, manufacturing information for the tire 103 (e.g., manufacture name, tire model, etc.), tire size information (e.g., rim size, width, and outer diameter, etc.), manufacturing location, manufacturing date, a treadcap code that includes or correlates to a compound identification, a mold code that includes or correlates to a tread structure identification, and/or other information. The vehicle tire data 524 may also include a service history data 528 or other information to identify specific features and parameters of each tire 103. The vehicle tire data 524 can further include radar signal data 514 acquired from the apparatus 200 on the vehicle 503, and/or other data.

The components executed on the computing environment 509, for example, can include a vehicle tire management system 536, a remote tire monitoring system 539, and other applications, services, processes, systems, engines, or functionality not discussed in detail herein. The vehicle tire management system 536 is executed to track the location and status of tires 103 mounted on a plurality of vehicles 503. Such a vehicle tire management system 536 may track hundreds if not thousands of tires 103 on many vehicles 503. The vehicle tire management system 536 indicates to users and/or operators when tires 103 may need to be serviced, replaced, or the vehicle tire management system 536 may provide other information.

The remote tire monitoring system 539 is executed to detect a condition or fault (e.g., FOD) of a tire 103 by monitoring the tire information and radar signal data 514 obtained from the apparatus 200 on the vehicles 503. In various examples, the remote tire monitoring system 539 can detect an issue with a tire 103 based upon analysis of the radar signal data 514. In various examples, tire maintenance and/or replacement can be initiated or scheduled based upon the analysis.

In one or more examples, upon detecting an issue with the tire 103, the remote tire monitoring system 539 can generate an alert notification indicating the detected issue. The alert notification can be a visual alert (e.g., user interface, indicator light on vehicle, etc.) or an audio alert, as can be appreciated. In some examples, the remote tire monitoring system 539 can transmit the alert notification to a computing device associated with the vehicle 503 and/or user of the vehicle, a client device 527, one or more vehicle computing devices 506, and/or another device. In some examples, upon detecting the issue, the remote tire monitoring system 539 can notify the vehicle tire management system 536 of the issue such that the vehicle tire management system 536 can proceed with sending a notification to the user or associate associated with the vehicle 503.

In various examples, the remote tire monitoring system 539 can further be executed to generate a 3D image of the tire 103 when the tire 103 is known be in the expected location. For example, the 3D image can be generated using previously collected radar signal data 514. In this example, the remote tire monitoring system 539 can obtain previously received radar signal data 514 and generate 3D images for comparison with a 3D image generated from current radar signal data 514.

In various examples, the tire monitoring system 509 can be executed to implement the functionalities of the remote tire monitoring system 539. For example, the tire monitoring system 509 can be executed to detect a fault in a tire 103 from the radar signal data provided by the apparatus 200 and transmitted to the receiver 512. In various examples, the tire monitoring system 509 can detect an issue with a tire 103 from a 3D image generated from the radar signal data 514.

The client device 527 is representative of a plurality of client devices 527 that may be coupled to the network 518. The client device 527 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 527 may include a display 528. The display 528 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 527 may be configured to execute various applications such as a client application 532 and/or other applications. The client application 532 may be executed in a client device 527, for example, to access network content served up by the computing environment 515, vehicle computing device 506, apparatus 200 on a vehicle 503, and/or other servers or systems, thereby rendering a user interface 529 on the display 528. To this end, the client application 532 may comprise, for example, a browser, a dedicated application, etc., and the user interface 529 may comprise a network page, an application screen, etc. The client device 527 may be configured to execute applications beyond the client application 532 such as, for example, email applications, social networking applications, word processors, spreadsheets, and/or other applications.

While the networked environment 500 of FIG. 5 has been discussed in the context of a vehicle 503, the networked environment 500 is equally applicable to the inspection apparatus 300 of FIG. 3. Processing circuitry 209 of the apparatus can communicate tire information including radar signal data from the inspection apparatus 300 to the computing environment 515 for storage and processing as previously discussed with regard to the vehicle tire management system 536 and remote tire monitoring system 539. This can facilitate monitoring of the tire condition over the entire life of the tire 103, from testing at the initial fabrication to retreading and reuse of the tire 103.

Figure 6:
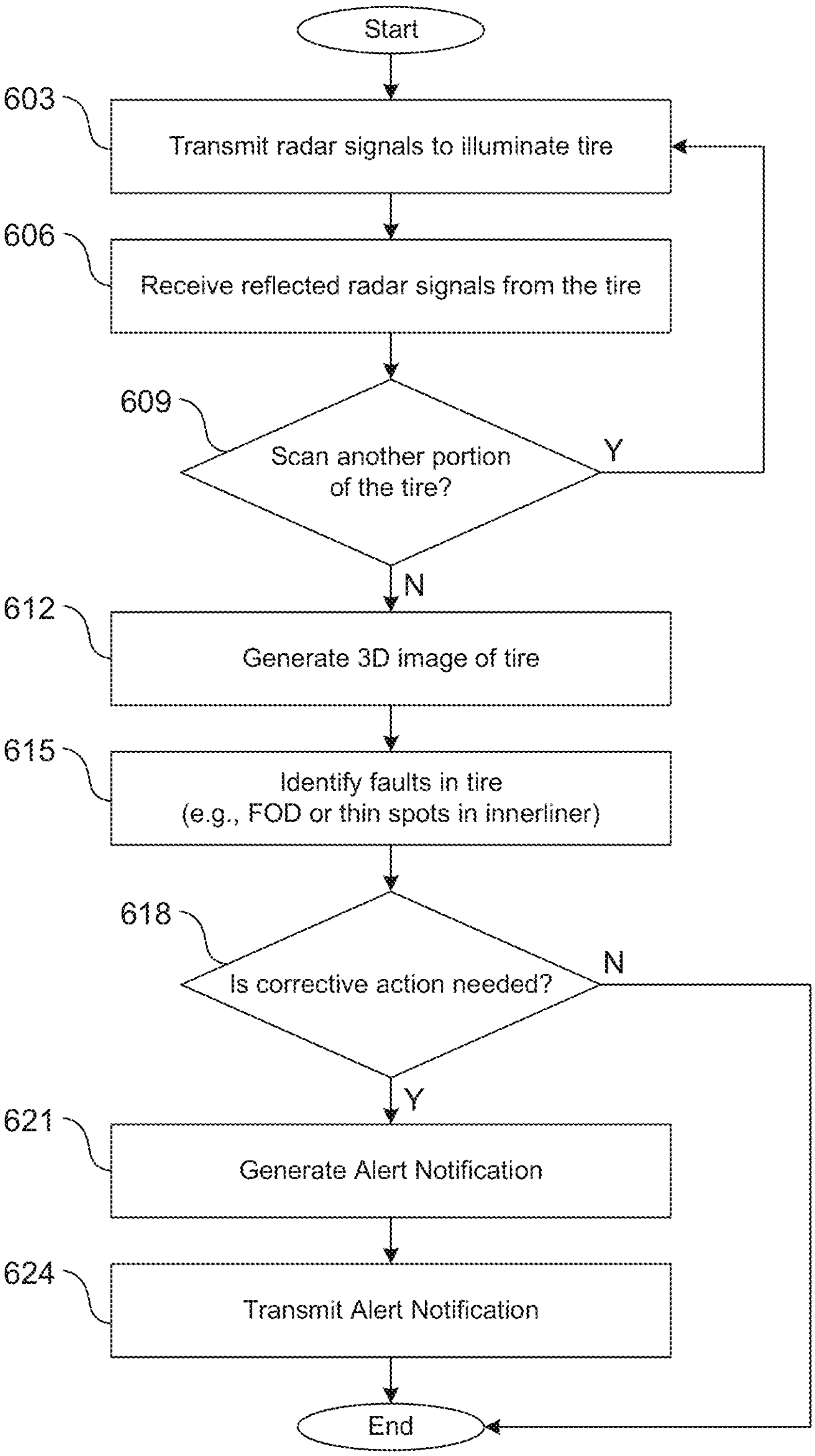
FIG. 6 is a flowchart illustrating one example of functionality implemented as portions of a tire monitoring application according to various embodiments of the present disclosure.

Next, a general description of the operation of the various components of the networked environment 500 is provided with respect to FIG. 6. To begin, FIG. 6 is a flowchart 600 illustrating an example of the operation of a portion of the apparatus 200 for radar tomography of tires 103, the tire monitoring system 509, and/or the remote tire monitoring system 539 according to various embodiments of the present disclosure. It is understood that the flowchart of FIG. 6 provides merely an example of the many different types of functional arrangements that may be employed to implement the operation of the portion of the of the tire monitoring system 509, remote tire monitoring system 539, vehicle tire management system 536, and/or other applications as described herein. As an alternative, the flowchart of FIG. 6 may be viewed as depicting an example of elements of a method implemented in the computing environment 500 according to one or more embodiments. Although the discussion of FIG. 6 relates to the remote tire monitoring system 539 it should be noted that the discussed functionality can be implemented in the vehicle computing device 506 (e.g., tire monitoring system 509), the inspection apparatus 300, apparatus 200, and/or another device or system.

Beginning at 603, radar signals can be transmitted to illuminate a portion of a tire 103 using, e.g., the apparatus 200 illustrated in FIG. 2. For example, the tire 103 can be located on an inspection apparatus 300, as discussed with respect to FIG. 3, or can be located on a vehicle 503, as discussed with respect to FIG. 5. The tire 103 can be rotated as it is being illuminated by the transmitted radar signals. The radar signals can be transmitted over a range of frequencies depending on the tire 103, the materials of the tire 103, and the desired resolution. Reflected radar signals are received by the apparatus 200 at 606.

At 609, it can be determined if another portion of the tire 103 (e.g., a sidewall or the innerliner 119) needs to be scanned. If so, then the apparatus 200 (or probe 303 of FIG. 3) can be repositioned for examining the next portion and the flow returns to 603 wherein radar signals are transmitted to illuminate the next portion and the reflected radar signals are received at 606. If another portion is not needed, then the flow proceeds to 612 where a 3D image of at least a portion of the tire 103 can be generated based upon the reflected radar signals. The 3D image can be generated by the processing circuitry 209 of the apparatus 200, or radar signal data for the reflected radar signals can be communicated (e.g., via a wired connection or wireless link) to another computing device (e.g., vehicle computing device 506 or another computing device associated with the inspection apparatus 300) or to the computing environment 515 for generation of the 3D image. For instance, the 3D image can be generated by the tire monitoring system 509 or the remote tire monitoring system 539.

Using the 3D image, faults in the tire 103 can be identified at 615. For example, foreign object damage (FOD) can be identified in the tread 106 and undertread 113 of the tire 103 or thin spots in the innerliner 119 can be identified. Gauge information for the different layers of the tire 103 can also be determined from the reflected radar signals and/or 3D image. Other voids or separation between layers may also be identified from the generated 3D image. Identification of faults may be automated and carried out by the tire monitoring system 509 and/or remote tire monitoring system 539. In some cases, the 3D image may be displayed for evaluation by a user or operator to determine the presence of a fault.

At 618, it can be determined if a corrective action is needed to address an identified fault in the tire 103. If an action is needed, an alert notification can be generated at 621 and transmitted at 624. The alert notification indicate the identified fault and a location on the tire 103. It may also display a portion of the 3D image showing the fault for further evaluation by the user or operator. The notification can also initiate scheduling for service or maintenance to correct or repair the fault in the tire. For example, the vehicle tire management system 536 can store the notification for the identified tire 103 and may initiate corrective action to be taken.

Figure 7:
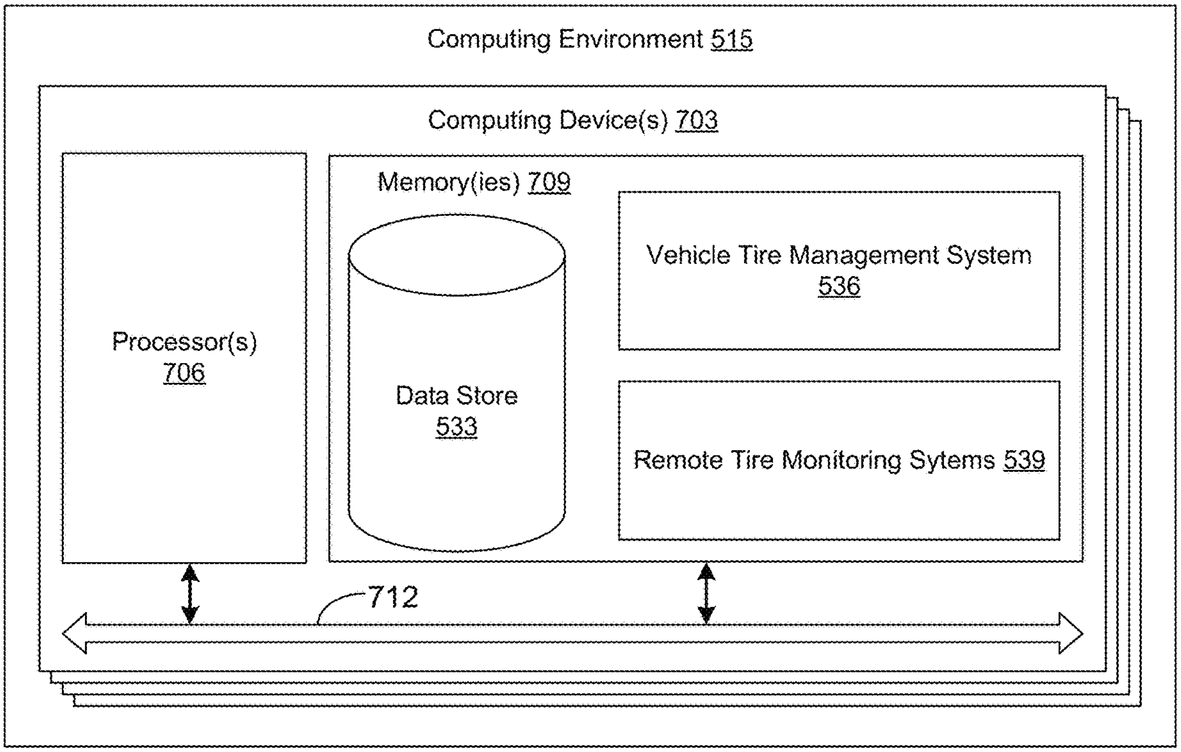
FIG. 7 is a schematic block diagram that provides one example illustration of a computing environment employed in the networked environment of FIG. 5 according to various embodiments of the present disclosure.

With reference to FIG. 7, shown is a schematic block diagram of the computing environment 515 according to an embodiment of the present disclosure. The computing environment 515 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are the vehicle tire management system 536, the remote tire monitoring system 539, and potentially other applications. Also stored in the memory 709 may be a data store 533 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the vehicle tire management system 536, the remote tire monitoring system 539, the tire monitoring system 509, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the remote tire monitoring system 539 and/or the tire monitoring system 509. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the vehicle tire management system 536, the remote tire monitoring system 539, and the tire monitoring system 509, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the vehicle tire management system 536, the remote tire monitoring system 539, the tire monitoring system 509, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices 703 in the same computing environment 515.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus, comprising:

a transmitter configured to transmit a radar signal to penetrate and illuminate a portion of a tire, wherein the portion of the tire includes sub-surface layers;

a receiver configured to receive reflected radar signals from the portion of the tire, wherein the reflected radar signals include reflections from the sub-surface layers; and processing circuitry comprising a processor, the processing circuitry configured to generate a three-dimensional (3D) image of at least the portion of the tire, wherein the portion of the tire includes the sub-surface layers, and the 3D image is based at least in part upon the reflected radar signals.

2. The apparatus of claim 1, wherein the 3D image comprises gauge information for surface layers and the sub-surface layers of material in the tire.

3. The apparatus of claim 1, wherein the 3D image comprises foreign object damage information for the tire.

4. The apparatus of claim 1, wherein the radar signal is transmitted via a first antenna or antenna array and the reflected radar signals are received via a second antenna or antenna array.

5. The apparatus of claim 1, wherein the radar signal illuminates a portion of a tread of the tire, the radar signal extending across a width of the tread from shoulder-to-shoulder.

6. The apparatus of claim 5, wherein the tire is illuminated by the radar signal while rotating, and the receiver receives reflected radar signals during the rotation of the tire.

7. The apparatus of claim 5, wherein the tire is held in a fixed position, and the receiver receives reflected radar signals during rotation of the transmitter and receiver around the tire.

8. The apparatus of claim 1, wherein the radar signal illuminates a portion of an innerliner of the tire.

9. The apparatus of claim 1, wherein the apparatus is a handheld apparatus configured to render the 3D image on a display.

10. A method, comprising:

transmitting radar signals to penetrate and illuminate a portion of a tire, wherein the portion of the tire includes sub-surface layers;

receiving reflected radar signals from the portion of the tire, wherein the reflected radar signals include reflections from the sub-surface layers; and generating a three-dimensional (3D) image of at least the portion of the tire, wherein the portion of the tire includes the sub-surface layers, and the 3D image is based at least in part upon the reflected radar signals.

11. The method of claim 10, comprising identifying foreign object damage in the tire based at least in part upon the 3D image.

12. The method of claim 10, wherein the 3D image comprises gauge information for an innerliner of the tire.

13. The method of claim 12, comprising identifying a thin spot in the innerliner based at least in part upon the 3D image.

14. The method of claim 10, comprising rotating the tire during transmission of the radar signals and reception of the reflected radar signals.

15. The method of claim 10, wherein the portion of the tire comprises a sidewall of the tire.

16. A system, comprising:

a transmitter configured to transmit a radar signal to penetrate and illuminate a portion of a tire, wherein the portion of the tire includes sub-surface layers;

a receiver configured to receive reflected radar signals from the portion of the tire, wherein the reflected radar signals include reflections from the sub-surface layers;

at least one computing device configured to generate a three-dimensional (3D) image of at least the portion of the tire, wherein the portion of the tire includes the sub-surface layers; and processing circuitry configured to communicate reflected radar data corresponding the reflected radar signals to the at least one computing device, the 3D image based at least in part upon the reflected radar data.

17. The system of claim 16, wherein the transmitter, the receiver and the processing circuitry are located on a vehicle adjacent to the tire, and the processing circuitry is configured to communicate the reflected radar data to the at least one computing device via a wireless link.

18. The system of claim 17, wherein the at least one computing device is remotely located, and the wireless link is a cellular data link.

19. The system of claim 17, wherein the at least one computing device is a vehicle computing device and the vehicle computing device is configured to identify damage to the tire based at least in part upon the 3D image and provide a notification of the identified damage.

20. The system of claim 16, wherein the portion of the tire comprises a sidewall of the tire.

* * * * *